United States Patent [19]

Canziani et al.

[11] Patent Number: 5,676,519
[45] Date of Patent: Oct. 14, 1997

[54] DESTACKER FOR SMALL FLAT PACKAGES SUCH AS AUDIO/VIDEO CASSETTES AND THE LIKE

[75] Inventors: Francesco Canziani, San-Macario-VA; Renato Tacchi, Lonate Pozzolo-VA, both of Italy

[73] Assignee: Sandvik AB, Sandviken, Sweden

[21] Appl. No.: 721,528

[22] Filed: Sep. 26, 1996

[30] Foreign Application Priority Data

Sep. 29, 1995 [IT] Italy .................. I95O0663 U

[51] Int. Cl.⁶ .................................................. B65G 59/04
[52] U.S. Cl. ........................................ 414/798.9; 414/737
[58] Field of Search .......................... 414/737, 798.9

[56] References Cited

U.S. PATENT DOCUMENTS 4,042,126  8/1977  Blauvelt et al. ............... 414/796.6 X
4,566,846  1/1986  Cartwright ..................... 414/737 X
5,234,314  8/1993  Ganz ........................... 414/798.9 X

FOREIGN PATENT DOCUMENTS 1-162649  6/1989  Japan .......................... 414/798.9

*Primary Examiner*—Janice L. Krizek
*Attorney, Agent, or Firm*—Burns, Doane, Swecker & Mathis, L.L.P.

[57] ABSTRACT

A destacker for small flat packages such as audio or video cassettes includes a gripper for gripping a vertically oriented package of a horizontal stack of such packages, and transferring the package to a releasing location while simultaneously repositioning the package into a horizontal orientation. The gripper is mounted to a pair of pivoted links. An actuator causes the links to rotate such that the gripper is transferred while being initially rotated in a first direction and finally being rotated in an opposite direction.

6 Claims, 3 Drawing Sheets

DESTACKER FOR SMALL FLAT PACKAGES SUCH AS AUDIO/VIDEO CASSETTES AND THE LIKE

BACKGROUND OF THE INVENTION

The present invention relates to the handling of packaged articles that are to be handled with care, and especially the destacking of packages wherein a package of a stack of the packages is to be removed from the stack and transferred to another location.

Systems are known which convey a horizontal stack of packages, such as compact disks and audio cassettes, along a substantially horizontal support and lay them, for example, onto a conveyor belt.

It is known that packages of products like compact disks and audio cassettes are covered with a material that is readily subject to scratching. Even though scratches on the cover do not jeopardize the package or the product, they are nonetheless felt to be a defect, and the utmost care is consequently applied to avoid them.

For example, in the packaging plants such scratches can result from a rubbing together of adjacent packages that causes abrasion of the packages. In that regard, the CDs, after being packaged, are usually introduced, in a vertical (upright) orientation onto an essentially horizontal guide to form a horizontal stack of packages which is advanced, until the packages fall, or are laid, onto a conveyor belt and transferred to a station at which they are packed for shipment. During such a handling, the rubbing of the packages against one another, or against a surface, can occur thereby causing scratches.

SUMMARY OF THE INVENTION

For this purpose the present invention proposes an apparatus and method for individually taking a package that is arranged in an upright position, while avoiding any impact or friction against an adjacent package, and laying it onto a conveyor belt such that it lies on its larger surface.

The apparatus should operate reliably and be capable of being made in a simple, cost effective way.

The invention relates to a destacking apparatus for removing a package from a stack of packages at a first location and transferring the package to a second location. The apparatus comprises a releasable gripper for gripping the package, an actuator, and a linkage connected to the actuator for being displaced by the actuator in one direction from a package-receiving position to a package-releasing position. The linkage is connected to the gripper for displacing the gripper and the package from the first location to the second location while rotating the gripper and package in a first direction of rotation during an initial stage of displacement of the linkage, and for rotating the gripper and package in an opposite direction of rotation during a subsequent stage of the displacement of the linkage.

The linkage preferably includes first and second links. The first link is pivotably connected at one end to a frame to define a first axis, and is pivotably connected at another end to the gripper to define a second axis. The second link is pivotably connected at one end to the frame to define a third axis disposed parallel to the first axis, and is pivotably connected to the gripper to define a fourth axis parallel to the second axis. The first link is longer than the second link. The third axis is disposed within an imaginary circle formed by rotation of the second axis about the first axis.

The gripper preferably includes suction cups and is preferably connected to the links for receiving a vertically oriented package at the first location and repositioning the package into a horizontal orientation for release at the second location.

BRIEF DESCRIPTION OF THE DRAWING

The objects and advantages of the invention will become apparent from the following detailed description of preferred embodiments thereof in connection with the accompanying drawing in which like numerals designate like elements, and in which.

DETAILED DESCRIPTION OF A PREFERRED EMBODIMENT OF THE INVENTION

Referring to the figures, a destacker 1 comprises a gripper or support for gripping packages P such as CDs, the gripper preferably including suction cups 2 movable between a removing position (FIG. 1) and a releasing position (FIG. 2) by means of a kinematic mechanism 3.

Figure 1:
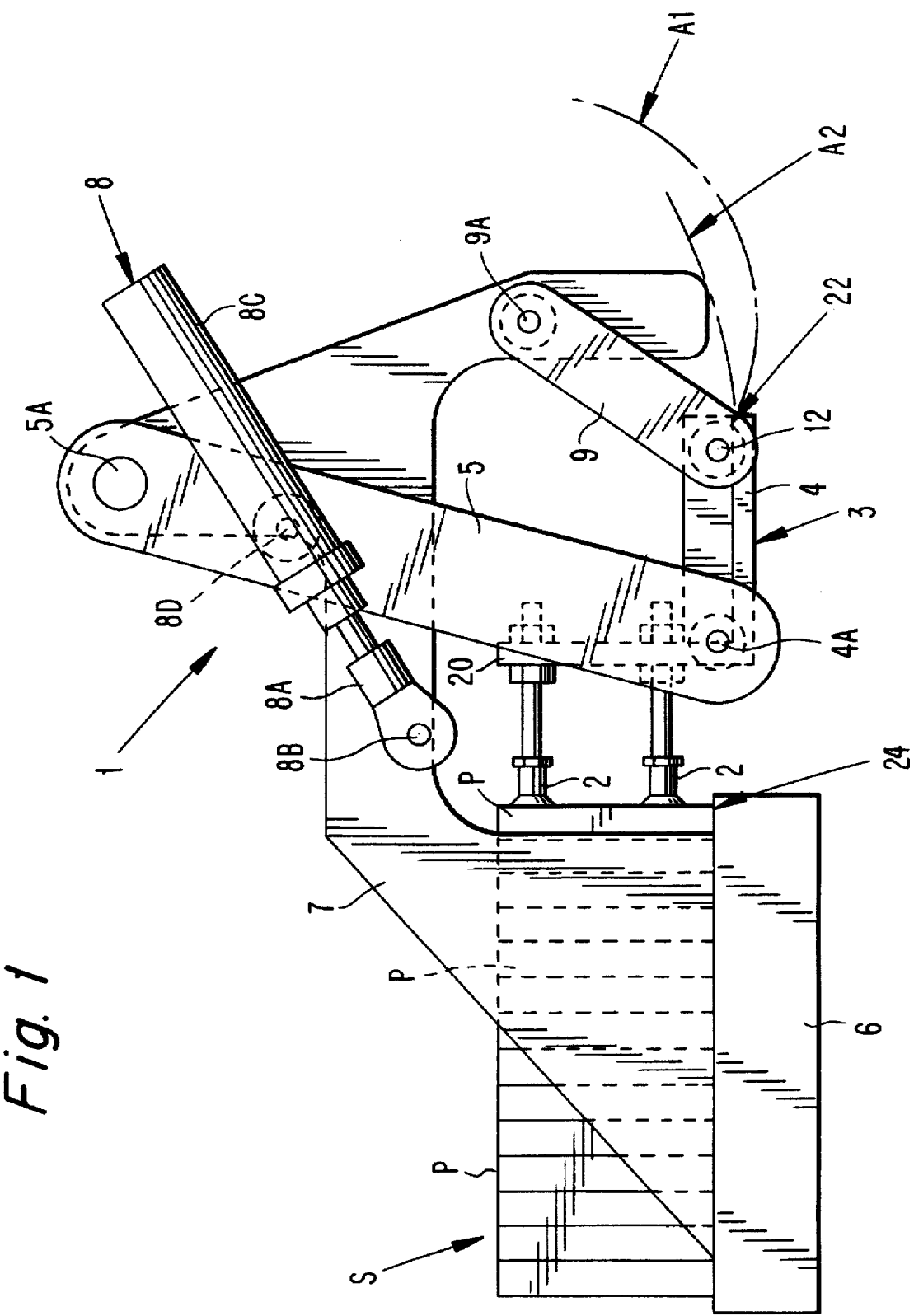
FIG. 1 illustrates a destacker according to the invention during a step in which a package is received.
Figure 2:
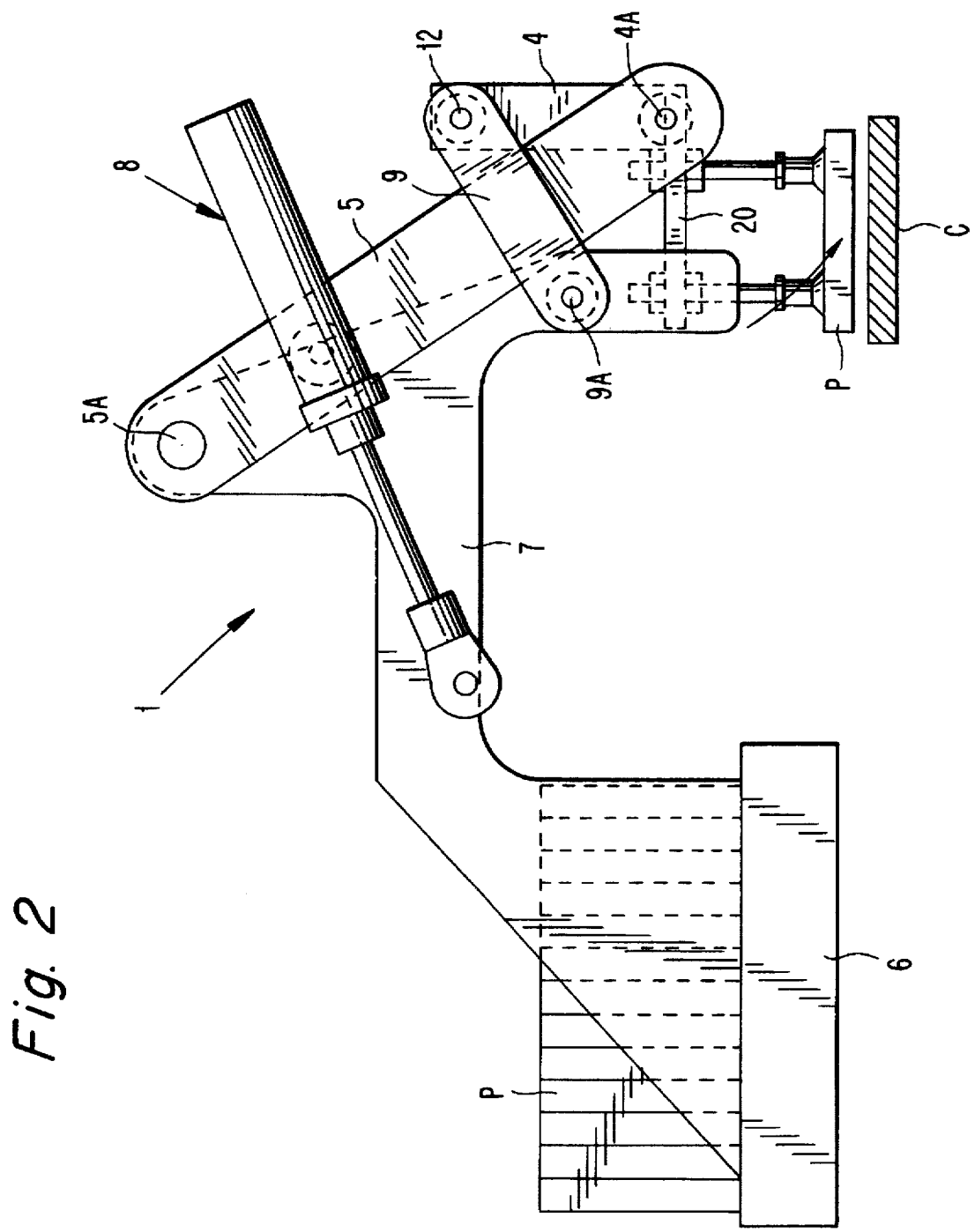
FIG. 2 illustrates the destacker of FIG. 1 during a package releasing step.

In particular, the suction cups 2 are fixed to a bracket 20, the bracket being fixed to an end of a rod 4 that reciprocally moves, with a rototranslation motion, between a first essentially horizontal position, which is shown in FIG. 1, and a second essentially vertical position, shown in FIG. 2, for taking a vertically oriented leading package P from the front position of a stack S of the packages that is advanced along a support surface 6A formed by a guide 6, and laying the package onto a conveyor belt C in an essentially horizontal orientation.

Rod 4 is displaced by the mechanism 3 which includes a pair of connecting links 5 and 9.

A first end of the rod 4, i.e., an end to which the bracket 20 is fastened is hinged by a horizontal pin 4A to the connecting link 5 which, in turn, is hinged by a horizontal pin 5A to a fixed machine frame 7.

A second end of rod 4 is hinged by a horizontal pin 12 to the connecting link 9 which is shorter than the connecting link 5. The link 9 is also hinged to frame 7 by a horizontal pin 9A.

A piston 8 includes a rod 8A which is hinged intermediate its ends by a horizontal pin 8B to frame 7, and a cylinder 8C which is hinged by a horizontal pin 8D to the connecting link 5. The piston 8 controls the rotation of connecting link 5 around the pin 5A.

Upon actuation of the piston actuator 8 whereby the actuator is extended, the connecting rod 5 is rotated about the pin 5A, causing the rod 4 to rotate about pins 4A and 12. Pins 12 and 4A themselves are constrained to move along first and second circular paths A1 and A2, respectively, which circular paths have pins 5A and 9A as their respective centers of rotation. It will be appreciated that the first path A1 has a shorter radius of curvature then the second path A2, and the center of curvature 9A of the second path A2 lies inside of a circle defined by the second path A2.

The operation is as follows:

When piston 8 is caused to retract, the support 20 assumes a vertical position in parallel with the surface of the CDs that are advanced along the guide 6, while the suction cups 2 are brought into contact with the first a leading package to be taken.

Figure 3:
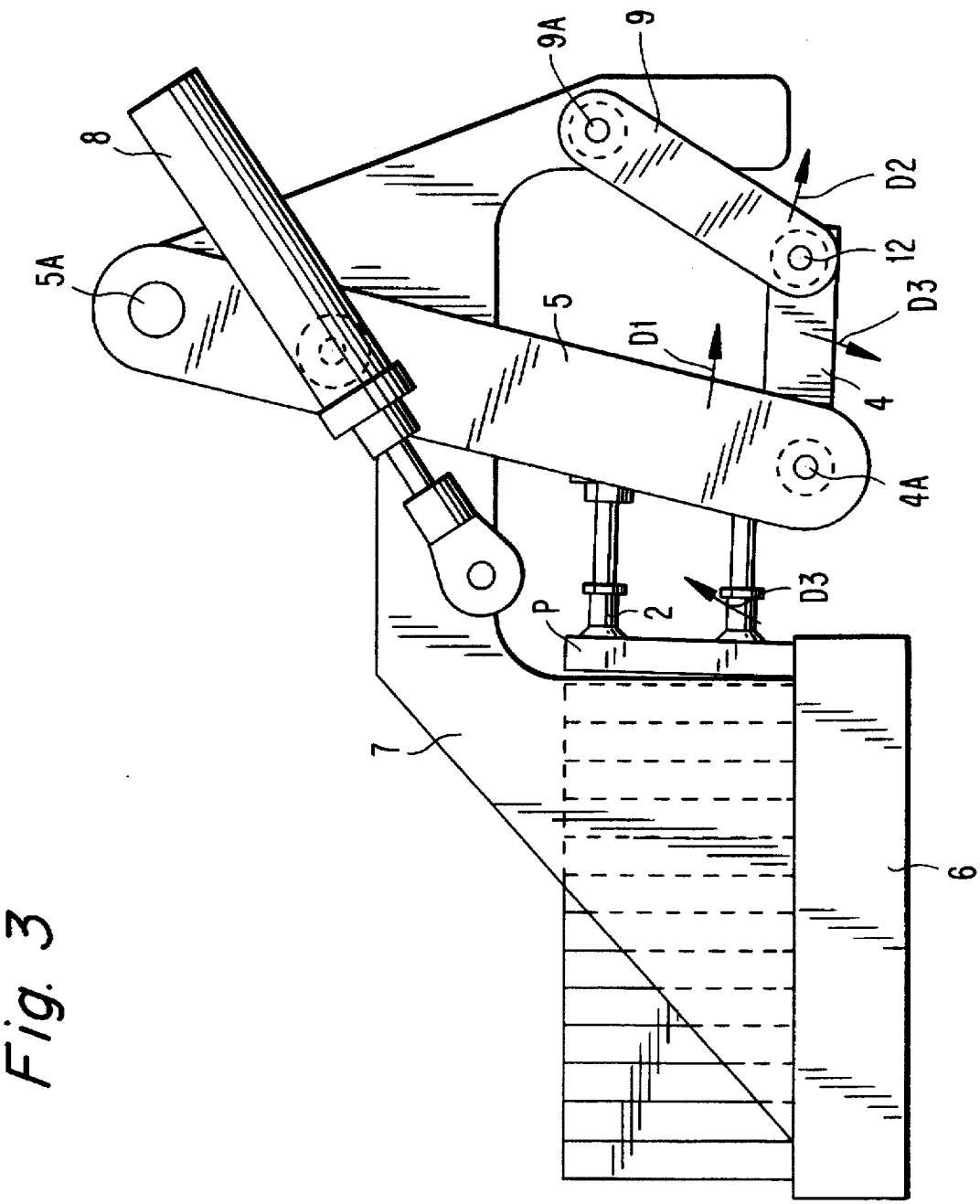
FIG. 3 illustrates the destacker immediately following the initiation of the package-receiving step.

The suction cups are then energized in a known manner, for example by sucking air from the inside part thereof, in order to cause them to adhere to the first package P, whereafter the piston 8 is extended to rotate the links 5 and 9 counterclockwise in directions D1, D2 (see FIG. 3).

During the initial rotation of links 5 and 9, the pins 4A and 12 travel downwardly along the paths A2, A1, respectively. Since the radius of curvature of path A1 is greater than that of path A2, the pin 12 travels downwardly at a faster speed than the pin 4A, causing the rod 4 to pivot clockwise in the direction indicated by arrows D3 as shown in FIG. 3. Therefore, even though both ends of the rod 4 are moving downwardly, the suction cups 2 are swinging upwardly relative to the pin 4A, since the support 20 is pivoting clockwise about that pin 4A. As a result, the gripper and package P tends to rotate clockwise about an axis located in the region of its lower front edge 24, causing it to be separated from the next package in the stack. Such rotation constitutes an initial stage of a path of travel of the gripper and package P. Due to the relatively short distance between the pins 4A and 12, the angular speed, i.e., the speed of rotation of the support 20, is appreciably greater than that of the connecting link 5, so the separation occurs relatively quickly.

During continued rotation of the links 5 and 9, and before the links 5 and 9 reach a vertical orientation, the support 20 is displaced up and away from the guide 6 while being rotated clockwise. When the links 5, 9 pass their vertical dead center orientations, the pins 12, 4A begin to move upwardly. Again, due to the shorter length of link 9 relative to link 5, the pin 12 will ascend more rapidly than the pin 4A, causing the support 20 to reverse its rotation, i.e., to rotate counterclockwise. That defines a subsequent stage of the travel path and occurs until the links reach the release position of FIG. 2, whereupon the package P has assumed a horizontal orientation and can be placed onto the conveyor C to which it is now oriented parallel. The suction cups are then deenergized to allow the package P to fall onto the conveyor.

The stack of packages P is advanced to position the next package in place to be gripped by the suction cups.

It will be appreciated that the piston 8 could be connected to the link 9 rather than to the link 5. Also, the rod 4, and the links 5 and 9 could be provided in the form of parallel, spaced apart pairs, i.e., two rods 4, two links 9, and two links 5. Also, an actuator other than a linear actuator 8 could be used, such as a rotary actuator. Moreover, the apparatus could be operated in reverse to transfer a package from a horizontal orientation to a vertical orientation.

The present invention enables packages such as CDs, audio cassettes and the like to be transferred from one place to another without causing the packages to be scraped, and thereby avoiding the application of scratches to the package.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination, a generally horizontal support surface, a horizontal stack of generally vertically oriented packages resting on the support surface, and a destacking apparatus for removing a leading one of the packages from the stack and transferring the leading package to a package-release location, the destacking apparatus comprising:

a releasable gripper for gripping the leading package;

an actuator for displacing the gripper; and a linkage interconnecting the gripper and actuator and configured for moving the gripper and leading package through a path of travel including an initial stage in which the gripper and leading package are rotated in a first direction of rotation away from a subsequent package located immediately adjacent the leading package to prevent the leading package from scraping against the subsequent package, and a subsequent stage in which the gripper and package are rotated in a second direction of rotation opposite the first direction of rotation en route to the package-release location.

2. The combination according to claim 1, wherein the entire subsequent stage consists of the rotation of the gripper and leading package in the second direction of rotation.

3. The destacking apparatus according to claim 1, wherein the linkage includes first and second links; the first link pivotably connected at one end to a frame to define a first axis, and pivotably connected at another end to the gripper to define a second axis; the second link pivotably connected at one end to the frame to define a third axis disposed parallel to the first axis, and pivotably connected to the gripper to define a fourth axis parallel to the second axis; the first link being longer than the second link; the third axis disposed within an imaginary circle formed by rotation of the second axis about the first axis.

4. The destacking apparatus according to claim 3, wherein the gripper includes suction cups.

5. The combination according to claim 1 wherein the leading package is held substantially horizontally by the gripper at the package-releasing location.

6. The combination according to claim 5 wherein the package-release location is defined by a substantially horizontally moving conveyor.

* * * * *